United States Patent Office 3,075,915
Patented Jan. 29, 1963

3,075,915
HYDRODESULFURIZATION CATALYST AND
THE METHOD OF MANUFACTURE
Melvin R. Arnold, Louisville, Ky., Donald O. McCarthy, Villa Grove, Ill., and Edward K. Dienes, Louisville, Ky., assignors to Chemetron Corporation, Chicago, Ill., a corporation of Delaware
No Drawing. Filed June 9, 1958, Ser. No. 745,235
(Filed under Rule 47(a) and 35 U.S.C. 116)
12 Claims. (Cl. 208—216)

This invention relates generally to catalytic hydrogenation of petroleum stocks and fractions and more particularly to an improved cobalt-molybdenum-alumina catalyst suitable for hydrodesulfurization and other hydrogenation reactions and to the method of manufacturing such improved catalyst.

Many petroleum stocks contain sulfur compounds such as mercaptans, thiophenes and organic sulfides in small amounts, and these sulfur compounds have proved to be highly undesirable impurities, particularly when gasolines containing tetraethyl lead as an antiknock agent are to be produced. The presence of as little as about 0.05% sulfur in such fractions greatly increases the amount of tetraethyl lead which must be added in order to achieve a desired high octane rating. Accordingly, it has been found to be desirable to reduce the sulfur content to around 0.01% (100 p.p.m.). Hydrodesulfurization is a convenient method of reducing the sulfur content to this range. This process involves reacting the organic sulfur compounds with hydrogen in the presence of a hydrogenation catalyst to convert the sulfur to hydrogen sulfide which may be readily separated from normally liquid fractions.

Compounds of cobalt and molybdenum have been used for many years for such hydrodesulfurization as well as other hydrogenation reactions and, because both of these metals are costly, many different forms of supported catalysts in which minor amounts of the catalytic materials are incorporated on carrier material such as alumina have been developed.

In general these supported catalysts fall into three categories, namely: (1) those formed by coprecipitating compounds of the active metals and the alumina or other carrier from a single solution in order to form a gel of the carrier material having the catalytically active materials uniformly dispersed therein; (2) those formed by impregnation techniques where either or both the cobalt and molybdenum are deposited upon the carrier by dipping the carrier in a solution or solutions of the active material; and (3) those formed by mechanically mixing the solid active components and the carrier and forming the mixture into catalyst pellets. Generally speaking, the coprecipitated type catalysts are the most difficult to manufacture but make the most effective use of the catalytic material by virtue of high degree of dispersion which is achieved.

Impregnated catalysts formed by dipping techniques are easy to manufacture, but it is difficult to control the degree of dispersion, the distribution and the amount of the catalytically active material which is actually present in the catalyst. Moreover, when two catalytically active substances are present it is difficult to carry out a single impregnation of both materials, and if successive impregnations are employed, the number of steps in the manufacturing operation is increased often to the extent that the advantages inherent in the simpler operation of impregnation are lost.

The third type of operation, wherein the two active ingredients and the carrier are mechanically mixed in powder form and the mixed powder is formed into pellets, is, of course, the easiest to accomplish and has certain inherent advantages not possessed by the other methods. The exact amount of each ingredient present can be very readily controlled simply by weighing out the particulate material. Secondly, the distribution of the active material may be uniform throughout the pellets.

Cobalt-molybdenum catalysts formed by mechanical mixing have not come in wide use heretofore, because they have been inherently less active than catalysts made by coprecipitation or impregnation procedures containing the same amount of active ingredients. Thus in order to obtain the required activity to effect a desired rection in a catalyst prepared by dry mixing techniques, it has been necessary to utilize more of the costly active materials per unit volume of catalyst and less of the relatively inexpensive carrier. For this reason it has generally been considered more economical to employ impregnated catalysts in spite of the more costly manufacturing operations in order to be able to utilize less of the expensive ingredients.

We have discovered, however, a novel method of manufacturing supported cobalt-molybdenum catalysts which not only has all of the advantages accruing from mechanical mixing of the ingredients but also achieves such efficient utilization of the catalytically active ingredients that catalysts produced by our new method are surprisingly superior to conventional catalysts produced by impregnation or coprecipitation methods, though containing the same amounts of catalytically active materials. Moreover, the catalysts of our invention have great physical strength and will withstand repeated regenerations without appreciable deterioration.

The method of catalyst manufacturing which we have discovered for producing our novel cobalt-molybdenum catalysts comprises mixing alumina hydrate and a molybdenum oxide (or a molybdenum compound, such as molybdic acid or ammonium molybdate, which will form a molybdenum oxide when heated above about 600° F.) until a uniform mixture is formed, mulling said mixture with a solution of a cobalt salt with a strong mineral acid convertible to cobalt oxide upon calcination at the aforesaid temperature to disperse the cobalt salt uniformly throughout the mixture forming the resulting mixture into suitable catalyst shapes and calcining the shapes at a temperature of at least about 600° F. and not exceeding the sublimation temperature of the molybdenum oxide. Catalysts produced in accordance with this procedure have increased catalytic activity, particularly in the hydrodesulfurization of petroleum stocks, such as straight run naphtha cracked naphthas, middle distillates, cycle stocks, kerosene, diesel fuels, fuel oils and lube stocks. This procedure has the great advantage of simplicity in that the catalytically active materials may be incorporated in readily available forms by a simple mixing and mulling operation. Only one calcination is required in contrast to certain prior practices such as required for impregnation procedures.

The preferred carrier or support material in our catalysts, particularly where maximum activity is desired, is a hydrated alumina comprising approximately equal proportions of beta $Al_2O_3 \cdot 3H_2O$ and alpha $Al_2O_3 \cdot H_2O$ and upon calcination at a temperature of about 700 to 900° F. is converted largely to gamma $Al_2O_3$. During the calcination operation high temperatures should be avoided or "dead burned" alumina may result. Accordingly, it is preferred to calcine the catalyst at temperatures in the range of 600° to 1,000° F. In most instances, the carrier may consist entirely of alumina or hydrated alumina but in certain cases it may also contain other materials, such as hydraulic cement and binding clay which modify and improve the physical properties of the catalysts, such as resistance to high temperature steaming, without seriously affecting the activity of the catalysts.

After the mixture of alumina and molybdenum oxide has been treated with the aqueous solution of a cobalt salt, the wetted mixture may be dried and formed into any conventional form, such as by tableting, extrusion, pelleting or granulation, to form cylinders, spheres, rings or granules. During this operation it may be desirable to add a lubricant, such as graphite or aluminum stearate, which assists in the forming operation but which is burned off during the calcination procedure.

The amount of water added to the dry ingredients, either as cobalt salt solution or as additional water, may be varied over a fairly wide range. The minimum amount of total water, however, has been found to be about 10 percent of the weight of the mixture in most cases. If lesser amounts of water are used longer mixing may be required. On the other hand additional water aids in the dispersion and may be readily removed by drying operations.

The atomic ratio of cobalt to molybdenum in our catalysts may vary from 1:5 to 1:1. The relative quantities may be controlled by adjusting the amounts of molybdenum oxide and cobalt salt used in the initial steps of the catalyst manufacture. The cobalt salt may be any cobalt salt of a strong mineral acid which is soluble in water and convertable to the oxide upon calcination, such as cobalt chloride, cobalt nitrate and cobalt sulfate. In practice it is preferred to dissolve cobalt metal in a suitable acid such as nitric acid to produce the solution of cobalt salt because in this way the amount of cobalt can be carefully controlled. The pH of the solution must be less than about 7 or the cobalt may precipitate prematurely. The amounts of catalytically active materials should usually be as small as possible consistent with the required activity to accomplish the desired reaction. The minimum amount may usually be determined with little difficulty by laboratory tests made upon the petroleum stock to be treated. Generally speaking, the amounts of cobalt and molybdenum in the catalyst will fall within the ranges given below:

|  | Percent by weight |
| --- | --- |
| Cobalt as CoO | 1 to 5 |
| Molybdenum as $MoO_3$ | 2 to 20 |

The remainder of the catalyst is carrier.

Cobalt-molybdenum catalysts made in accordance with this invention have demonstrated unusually high activity and stability, as well as long life. For instance, they consistently reduce the sulfur content of petroleum stocks from values greater than 1,000 p.p.m. to values near 200 p.p.m. at hourly liquid space velocities of 3 and to values below 100 p.p.m. at hourly liquid space velocities of 1. These results compare favorably with those obtained with cobalt-molybdenum catalysts made by conventional but more complicated procedures.

Certain of the following examples are illustrative of methods of preparing catalysts within the limits of this invention and also illustrate the activity of the catalysts thus prepared in the dehydrosulfurization of petroleum stocks. These examples are given for the purposes of illustrating the invention but are not to be construed as limiting it in scope. It will be readily appreciated by those skilled in the art that numerous modifications in conditions, concentrations, relative quantities of materials and the like may be made without departing from the invention.

Example 1

A pelleted cobalt-molybdenum-alumina catalyst was prepared by the following procedure from the following materials:

|  | Parts by weight |
| --- | --- |
| Cobalt metal | 55 |
| Molybdenum trioxide ($MoO_3$) | 200 |
| Hydrated alumina (30% $H_2O$) | 2474 |

The cobalt metal was dissolved in aqueous nitric acid to form a solution containing 16.9% cobalt (calculated as CoO), the excess of nitric acid being kept below 2%. The molybdenum oxide and hydrated alumina were mixed in a Simpson intensive mixer for about five minutes. Then the solution of cobalt nitrate was diluted with about 2 volumes of water and added immediately to the mixture of molybdenum oxide and hydrated alumina while mixing of the latter was continued. Thereafter sufficient water (approximately 1.5 volumes based on the original volume of cobalt nitrate solution) was added to obtain proper mulling consistency. Mixing and mulling were continued until a uniform mixture was obtained. This was oven dried at 250° F. until a tabletable granulation was obtained. A lubricant was added and the mixture was then formed into 3/16 inch by 3/16 inch cylindrical pellets and then calcined for eight hours at 950° F. in air. The catalyst thus obtained contained, on analysis, 3.5% CoO and 9.1% $MoO_3$. The pellets had a side crush strength of 71 lbs. dead weight load. The catalyst had a bulk density of 60.8 lbs. per cubic foot.

Example 2

Cobalt-molybdenum-alumina catalyst was prepared from the following materials:

|  | Parts by weight |
| --- | --- |
| Cobalt metal | 5.5 |
| Molybdenum oxide ($MoO_3$) (99.5% purity) | 20.0 |
| Alumina hydrate (22% water of hydration) | 222.0 |
| Aluminum stearate | 6.0 |

The hydrated alumina and the molybdenum oxide were placed in a Simpson intensive mixer and mulled dry for twenty minutes. The cobalt was dissolved in nitric acid and diluted to a concentration of 5.5 lbs. of cobalt metal per 9 gallons of solution, the final solution containing less than 2% free nitric acid. The cobalt nitrate solution was added to the dry mixture of hydrated alumina and molybdenum oxide and the resulting mixture was mulled until uniform in color (3–5 minutes). Additional water was added to obtain proper consistency for mulling and the mixing and mulling were continued for an additional twenty minutes. The product was discharged to clean trays and dried at about 250° F. in an oven. The dried product was mixed with the aluminum stearate, granulated through a No. 16 screen and compressed into tablets 3/16 inch by 3/16 inch. The tablets were calcined for one hour at 400° F., one hour at 650° F. and six hours at 950° F.

Example 3

A pelleted cobalt-molybdenum catalyst was prepared from the following materials:

| Alumina hydrate (30% $H_2O$) | lbs | 245 |
| --- | --- | --- |
| $MoO_3$ | lbs | 20 |
| Cobalt nitrate solution (10% CoO) | gals | 9 |

The procedure was as follows:
(1) Dry mulled alumina hydrate with $MoO_3$.
(2) Added cobalt nitrate solution, followed by 4 to 5 gal. water to obtain proper mulling consistency.
(3) Tabletted as 3/16" x 3/16" pellets.
(4) Calcined 8 hours at 950° F.
(5) Analysis: 3.9% CoO and 9.4% $MoO_3$. Side crush strength: 29 lbs. DWL. Bulk density: 61.7 lbs./cu. ft.

Example 4

A cobalt-molybdenum catalyst was prepared according to the best teachings of the Nahin et al. Patent No. 2,486,361 by the following method: 292 ml. of 3.43 M cobaltous nitrate solution was added to 500 ml. of C.P. ammonium hydroxide solution (28%). A solution of 171.5 gm. of ammonium paramolybdate in 100 ml. of water was added to the cobalt solution. 477 gm. of calcined alumina pellets (3/16" x 3/16") were dipped in 405 ml. of the cobalt-molybdenum solution for 15 minutes, then removed and allowed to drain; 250 gm. of the solution was absorbed by the pellets. The pellets were dried in an oven at 110° C. for 16 hours, then calcined at 600° C. for 2 hours. Analysis showed 4.2% CoO and 6.9% MoO₃.

The catalysts produced in Examples 1 to 4 were evaluated at standard diesel fuel test conditions according to the following procedure:

The test catalyst was first sulfided by placing a batch of catalyst pellets in a stainless steel tubular reactor surrounded by a jacket space containing heated Dowtherm. Hydrogen sulfide gas at atmospheric pressure was passed over the catalyst for a period of two hours during which time the temperature within the reactor was maintained at 700° F. by the heated Dowtherm in the jacket space. The purpose of subjecting the catalyst to hydrogen sulfide was to initially sulfide any portions of the catalysts susceptible of taking up sulfur in order to obtain more accurate readings in the following test of the catalyst's ability to desulfurize petroleum stock.

A straight run No. 2 diesel fuel containing 1400 p.p.m. of organic sulfur was pumped through a preheater where the temperature was raised to 650–700° F. and then hydrodesulfurized over a 50 cc. bed of sulfided catalyst at 700° F. in the presence of a hydrogen feed gas (80% hydrogen, 20% methane) at the rate of 1500 s.c.f./bbl. at 300 p.s.i.g. at liquid hourly space velocities of 1 and 3.

The following are averages of results which were obtained in this test for the catalysts prepared above:

| Catalyst | Sulfur Content of Effluent, 1 L.H.S.V., p.p.m. | Sulfur Content of Effluent, 3 L.H.S.V., p.p.m. |
| --- | --- | --- |
| Ex. 1 | 87 | 187 |
| Ex. 2 | 52 | 203 |
| Ex. 3 | 45 | 217 |
| Ex. 4 | 87 | 234 |

What is claimed as new and is desired to be secured by Letters Patent of the United States is:

1. A method of preparing a cobalt-molybdenum catalyst consisting essentially of 1% to 5% cobalt oxide by weight and 2% to 20% molybdenum oxide by weight on a carrier consisting essentially of alumina which comprises wetting a uniform mixture of solid hydrated alumina and a solid compound of molybdenum which after heating provides molybdenum oxide with an aqueous solution of a cobalt salt of a strong mineral acid to achieve uniform distribution of the cobalt salt throughout the solids, the pH of said solution being less than 7 and the amount of water therein being in excess of 10% of the weight of the mixture, and calcining the mixture at a temperature sufficient to at least partially activate the alumina by driving off water of hydration and to stabilize the cobalt and molybdenum by converting compounds of these metals to their respective oxides.

2. A method of preparing a cobalt-molybdenum catalyst consisting essentially of 1% to 5% cobalt oxide by weight and 2% to 20% molybdenum oxide by weight on a carrier consisting essentially of alumina which comprises mixing solid particulate hydrated alumina with solid particulate molybdenum oxide to achieve uniform distribution, wetting the dry solid mixture with an aqueous solution of a cobalt salt of a strong mineral acid having a pH less than 7 to achieve uniform distribution of the cobalt salt throughout the solids, forming the mixture into catalyst shapes, and calcining the catalyst at a temperature sufficiently high to at least partially activate the alumina by driving off water of crystallization and to stabilize the cobalt and molybdenum by converting compounds of these metals to the respective oxides.

3. The method of claim 1 wherein the atomic ratio of cobalt to molybdenum is in the range of 1:5 to 1:1.

4. A method of preparing a colbalt-molybdenum catalyst consisting essentially of 1% to 5% cobalt oxide by weight and 2% to 20% molybdenum oxide by weight on a carrier consisting essentially of hydrated alumina which comprises mixing solid particulate hydrated alumina containing 20% to 35% water of hydration with molybdenum oxide to achieve uniform distribution of the molybdenum oxide throughout the alumina, mixing the solids with an aqueous solution of a cobalt salt to achieve uniform distribution of the cobalt salt throughout the solids, forming the mixture into catalyst shapes and calcining the shapes at a temperature sufficiently high to at least partially activate the alumina by driving off water of crystallization and to convert the cobalt salt to cobalt oxide.

5. The method of claim 4 wherein the calcination is conducted at a temperature in the range of 650° F. to 1,000° F.

6. The method of claim 4 wherein the cobalt salt is cobalt nitrate.

7. A method for the catalytic hydrodesulfurization of hydrocarbons which comprises subjecting hydrocarbons to a temperature in the range of about 500° F. to 1,000° F. in the presence of a hydrogen-containing gas and a catalyst containing a major proportion of an alumina carrier and a minor proportion of a cobalt-molybdenum catalyst, said catalyst having been prepared according to the method of claim 1.

8. A method of hydrodesulfurizing hydrocarbons which comprises subjecting said hydrocarbons to a temperature in the range of about 500° F. to about 1,000° F. in the presence of a hydrogen-containing gas and a catalyst comprising a major proportion of an alumina carrier and a minor proportion of cobalt-molybdenum oxides, said catalyst having been produced according to the method of claim 4 by a method comprising mixing solid particulate hydrated alumina with solid particulate molybdenum oxide to achieve uniform distribution, wetting the dry solid mixture with an aqueous solution of a cobalt salt of a strong mineral acid to achieve uniform distribution of the cobalt salt throughout the solids, forming the mixture into catalyst shapes, and calcining the catalyst at a temperature sufficiently high to at least partially activate the alumina by driving off water of crystallization and to stabilize the cobalt and molybdenum by converting compounds of these metals to the respective oxides.

9. A method of hydrodesulfurizing hydrocarbons which comprises subjecting hydrocarbons containing organic sulfur in concentration greater than 300 parts of sulfur per million to a temperature in the range of about 500° F. to 1,000° F. in the presence of hydrogen and a catalyst comprising a major proportion of an alumina carrier and a minor proportion of cobalt-molybdenum oxides wherein the cobalt amounts to 1% to 5% of the catalyst measured as CoO and the molybdenum amounts to 2% to 20% of the catalyst measured as MoO₃, said catalyst having been produced according to the method of claim 4 by a method comprising mixing solid particulate alumina hydrate containing 20% to 35% water of hydration with molybdenum oxide to achieve uniform distribution of the molybdenum oxide throughout the alumina, mixing the resulting mixture with an aqueous solution of cobalt nitrate to achieve uniform distribution of the cobalt salt throughout the solids, forming the mixture into catalyst pellets and calcining the pellets at a temperature sufficiently high to at least partially activate the alumina by driving off water of crystallization and to convert the cobalt salt to cobalt oxide.

10. The method of claim 9 wherein the pressure of the hydrogen is between atmospheric and 1,000 p.s.i.g.

11. A method for the catalytic hydrodesulfurization of hydrocarbons which comprises subjecting hydrocarbons to a temperature in the range of about 500° F. to 1000° F. in the presence of a hydrogen-containing gas and a catalyst containing a major proportion of an alumina carrier and a minor proportion of a cobalt-molybdenum catalyst, said catalyst having been prepared according to the method of claim 2.

12. A method of preparing a cobalt-molybdenum catalyst consisting essentially of 1% to 5% cobalt oxide by weight and 2% to 20% molybdenum oxide by weight on a carrier consisting essentially of alumina which comprises wetting a uniform mixture of solid hydrated alumina and a solid compound of molybdenum which after heating provides molybdenum oxde with an aqueous solution of a cobalt salt of a strong mineral acid to achieve uniform distribution of the cobalt salt throughout the solids, forming the resulting mixture into catalyst shapes, and calcining the catalyst at a temperature sufficiently high to at least partially activate the alumina by driving off water of crystallization and to stabilize the cobalt and molybdenum by converting compounds of these metals to the respective oxides.

References Cited in the file of this patent

UNITED STATES PATENTS

| | | |
|---|---|---|
| 2,423,163 | Thomas | July 1, 1947 |
| 2,499,255 | Parker | Feb. 28, 1950 |
| 2,574,445 | Porter | Nov. 6, 1951 |
| 2,574,446 | Docksey et al. | Nov. 6, 1951 |
| 2,574,447 | Porter | Nov. 6, 1951 |
| 2,574,448 | Docksey et al. | Nov. 6, 1951 |
| 2,574,450 | Porter et al. | Nov. 6, 1951 |
| 2,574,451 | Porter et al. | Nov. 6, 1951 |
| 2,640,802 | Porter et al. | June 2, 1953 |
| 2,759,899 | Hanson | Aug. 21, 1956 |
| 2,793,170 | Stiles | May 21, 1957 |
| 2,849,372 | Hanson | Aug. 26, 1958 |